May 24, 1932.  F. RUTRLE  1,859,717
DRILLING AUGER
Filed Dec. 26, 1928
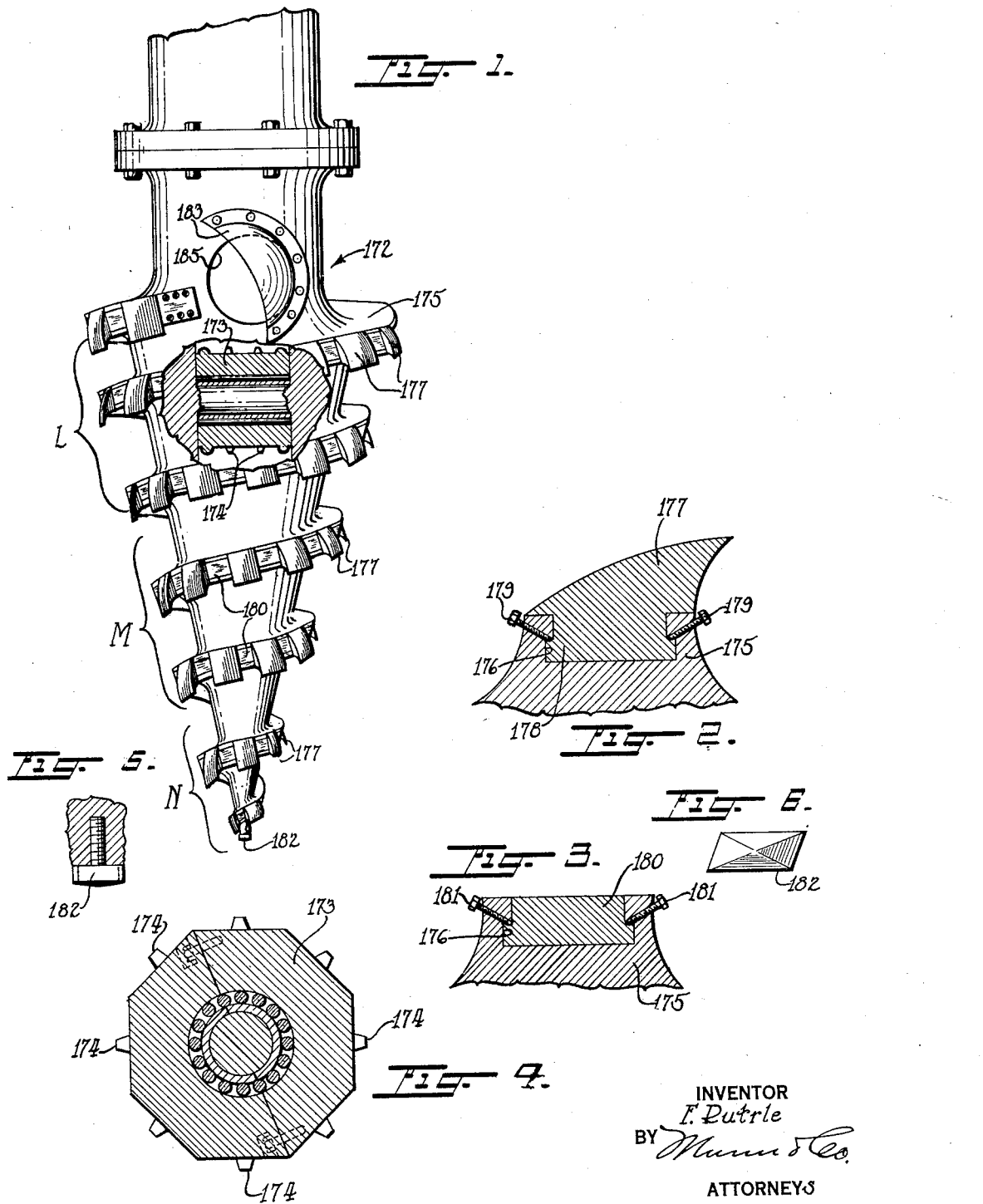
INVENTOR
F. Rutrle
BY Munn & Co.
ATTORNEYS Patented May 24, 1932

1,859,717

UNITED STATES PATENT OFFICE

FRANK RUTRLE, OF SHELBY, MONTANA

DRILLING AUGER

Application filed December 26, 1928. Serial No. 328,408.

My invention relates to improvements in drilling augers, and it consists in the combinations, constructions, and arrangements herein described and claimed.

An object of my invention is to provide a drilling auger for use in drilling devices in which detritus-conveying means is employed for carrying the detritus to the surface.

A further object is to provide an auger of the type described which is adapted to be rotated and which is provided with novel means whereby the detritus may be forced upwardly and may, if desired, be directed into the interior of the auger to the end that the detritus may be carried to the surface through the interior of a hollow drill shaft or by any other suitable means.

A further object is the provision of a rotary drilling auger which is provided with a spiral rib having spaced-apart teeth on its outer surface. The edges of the teeth may follow the contour of the rib in such a manner that the material cut by the teeth will fall on a portion of the rib below the teeth and be forced upwardly on the rib.

A further object of my invention is to provide an auger which is particularly adapted for use on drilling machines having detritus conveying means for carrying the detritus to the surface.

Other objects and advantages will appear in the following specification, and the novel features of the invention will be particularly pointed out in the appended claims.

My invention is illustrated in the accompanying drawings, forming part of this application, in which Figure 1 is a side elevation of an auger embodying my invention, Figure 2 is a detail view of one of the auger teeth, Figure 3 is a detail view of a portion of the auger, Figure 4 is a sectional view of the auger sprocket, Figure 5 is a sectional detail view of a portion of the auger, and Figure 6 is a bottom plan view of the device shown in Figure 5.

In carrying out my invention, I make use of an auger 172, a side elevation of which is shown in Figure 1. The auger 172 may, if desired, be connected with the bottom section of a drill shaft 171. The auger is provided with a roller 173 having teeth 174 thereon.

A bucket conveyor, not shown, may pass around the roller 173 and convey the detritus cut loose by the auger upwardly. The teeth 174 may engage openings in a bucket conveyor during the movement of the buckets around the roller.

The auger 172 is provided with a spiral laterally extending rib 175. The rib is grooved as at 176. The auger is provided with a plurality of teeth 177 which are removably mounted within the groove 176 in the rib. Each tooth is provided with a base portion 178 conforming to the shape of the groove and rigidly secured therein by means of suitable screws or bolts 179.

The teeth are spaced apart as shown in Figure 17 and are held in spaced relation by means of spacing blocks 180. The outer face of the spacing blocks is flush with the edge of the rib as shown in Figure 19. These blocks are shaped to conform to the groove and are also retained therein by means of bolts or screws 181. The teeth associated with the rib within the area L are of given size and the teeth within the area M are smaller. The teeth within the area N are progressively smaller than the teeth associated with the area M. The tooth 182, upon the extreme end of the auger, is rhomboidal in shape.

The auger is provided with a scoop 183 upon two opposite sides. These scoops are positioned with respect to openings 185 as shown in Figure 17.

During rotation of the auger the detritus cut loose by the auger is moved upwardly by reason of the rib construction and is deflected through the openings 185 by reason of the scoops 183. The detritus entering the auger will, of course, be collected by the buckets and conveyed to the surface.

It will be seen that the teeth have their cutting edges extending downwardly from the rib below the undersurface of the rib. The edges of the successive teeth are disposed in a spiral line which follows the contour of the rib. The material cut by the teeth tends to fall on the rib below, and, due to the rotation of the auger, this material is forced along the rib as a conveyor until it reaches the scoop, from whence it is guided into the interior of the auger and thence removed, as stated.

I claim:

1. In a device of the type described, an auger provided with a spiral rib and having a groove cut therein, cutting teeth having portions arranged to be removably disposed within the groove, and spacing blocks disposed between the teeth.

2. In a device of the type described, an auger provided with a spiral rib and having a groove cut therein, cutting teeth having portions arranged to be removably disposed within the groove, spacing blocks disposed between the teeth, and means for rigidly securing the teeth in position.

3. In a device of the type described, an auger having a tapered body portion provided with a spiral rib, and a series of spaced-apart teeth secured to the outer edge of said spiral rib, the cutting edges of said teeth being pointed downwardly and the edges of the successive teeth being arranged on a spiral line following the contour of the spiral rib.

4. In a device of the type described, an auger having a hollow portion provided with an opening in its side, a scoop disposed adjacent to said opening, said auger having a tapered body portion provided with a spiral rib, and a series of spaced-apart teeth secured to the outer edge of the spiral rib.

5. In a device of the type described, an auger having a tapered body portion, a spiral rib carried by said tapered body portion, the periphery of the rib having a groove therein, a plurality of spaced-apart teeth disposed in said groove, and means for securing the teeth in position.

6. In a device of the type described, an auger having a tapered body portion, a spiral rib carried by said tapered body portion, the periphery of the rib having a groove therein, and a plurality of spaced-apart teeth disposed in said groove, said teeth projecting downwardly beyond the undersurface of the rib.

7. In a device of the type described, an auger having a tapered body portion, a spiral rib carried by said tapered body portion, the periphery of the rib having a groove therein, and a plurality of spaced-apart teeth disposed in said groove, said teeth projecting downwardly beyond the undersurface of the rib and the edges of the successive teeth forming a spiral line.

Signed at Chicago, in the county of Cook, and State of Illinois this 20th day of December, A. D. 1928.

FRANK RUTRLE.